(12) United States Patent
Cohen (10) Patent No.: US 12,322,966 B2
(45) Date of Patent: Jun. 3, 2025

(54) SYSTEM AND METHOD FOR STORING ENERGY, AND FOR RECOVERING STORED ENERGY BY USING LIQUID AND GAS AS PISTONS

(71) Applicant: STORAGE DROP LTD, Rehovot (IL)

(72) Inventor: Shay Cohen, Kfar Saba (IL)

(73) Assignee: STORAGE DROP LTD, Rehovot (IL)

( * ) Notice: Subject to any disclaimer, the term of this patent is extended or adjusted under 35 U.S.C. 154(b) by 0 days.

(21) Appl. No.: 18/275,719

(22) PCT Filed: Feb. 4, 2022

(86) PCT No.: PCT/IL2022/050151
§ 371 (c)(1),
(2) Date: Aug. 3, 2023

(87) PCT Pub. No.: WO2022/168096
PCT Pub. Date: Aug. 11, 2022

(65) Prior Publication Data
US 2024/0297529 A1    Sep. 5, 2024

Related U.S. Application Data

(60) Provisional application No. 63/145,611, filed on Feb. 4, 2021.

(51) Int. Cl.
*H02J 15/00* (2006.01)
*F03B 13/06* (2006.01)

(52) U.S. Cl.
CPC ............ *H02J 15/006* (2013.01); *F03B 13/06* (2013.01); *F05B 2210/18* (2013.01); *F05B 2240/40* (2013.01); *F05B 2260/422* (2020.08)

(58) Field of Classification Search
CPC ............................... H02J 15/006; Y02E 70/30
See application file for complete search history.

(56) References Cited

U.S. PATENT DOCUMENTS 4,206,608 A * 6/1980 Bell .......................... F03D 9/17
290/55
7,663,255 B2 * 2/2010 Kim .......................... F02C 6/18
290/1 R
(Continued)

FOREIGN PATENT DOCUMENTS

CN         102506004 A     6/2012
WO       2017174047 A1    10/2022

OTHER PUBLICATIONS

International Search Report (ISR) for PCT/IL2022/050151 mailed May 31, 2022 (6 pages).

(Continued)

*Primary Examiner* — Thomas E Lazo
(74) *Attorney, Agent, or Firm* — Shumaker, Loop & Kendrick, LLP (57) ABSTRACT

An energy storage system, including: electrically powered liquid pumps, for streaming liquid into liquid-gas tanks; one or more liquid-gas tanks, adapted to intake a portion of gas and to utilize liquid streamed by the one or more electrically powered liquid pumps, as a piston for compressing the received portion of gas, wherein the one or more liquid-gas tanks are further adapted to deliver the compressed gas to one or more compressed gas storage tanks, and to stream the liquid back to the one or more electrically powered liquid pumps; one or more compressed gas storage tanks adapted to store compressed gas received from the one or more liquid-gas tanks; pipping components, branches thereof, and controllable valves, for enabling controlled streaming of liquid and gas through the storage system; a plurality of sensors, adapted to provide information related to liquid and gas in the storage system, such as to enable corresponding control of the storage system by one or more controllers; one (Continued)

or more controllers for managing the streaming of gas and liquid through the storage system.

10 Claims, 4 Drawing Sheets

(56) References Cited

U.S. PATENT DOCUMENTS

| | | | |
|---|---|---|---|
| 8,015,812 B1* | 9/2011 | Kesseli | F02C 6/16 |
| | | | 60/677 |
| 8,667,788 B2* | 3/2014 | Kenway | F15B 1/033 |
| | | | 60/415 |
| 9,611,868 B2* | 4/2017 | Kenway | F15B 1/033 |
| 9,752,452 B2* | 9/2017 | Hoose, Jr. | F03G 7/00 |
| 10,823,132 B2* | 11/2020 | Mesinger | F03B 17/005 |
| 2011/0288688 A1* | 11/2011 | Lehan | H02J 15/006 |
| | | | 700/282 |
| 2014/0190155 A1* | 7/2014 | Kenway | F02C 6/16 |
| | | | 318/504 |
| 2015/0132150 A1 | 5/2015 | Cantemir et al. | |
| 2018/0180019 A1* | 6/2018 | Jiang | H02J 15/006 |

OTHER PUBLICATIONS

Written Opinion (WO) for PCT/IL2022/050151 mailed May 31, 2022 (6 pages).

* cited by examiner

SYSTEM AND METHOD FOR STORING ENERGY, AND FOR RECOVERING STORED ENERGY BY USING LIQUID AND GAS AS PISTONS

FIELD OF THE INVENTION

The present invention is in the field of energy storage systems. More specifically, the invention relates to system and method for storing energy, and for recovering stored energy by using liquid and gas as pistons.

BACKGROUND OF THE INVENTION

Some sustainable energy sources, such as solar energy or wind blow energy, are characterized by non-continuous and non-stable energy production. In order to enable continuous energy flow from such sustainable energy sources use of energy storage systems is required to enable storage of energy during times when large amount of energy per time unit (e.g. electrical power) is received from the sustainable energy source, and extraction of the stored energy at times when the level of energy per time unit received from the sustainable source is low. Storage of energy may also be usable for storing energy at time of low-cost production of the energy (e.g. at nigh time for electrical energy) and for using that energy during time when the production of the energy is expensive.

Some known systems intended for storage of energy include electrical batteries, pumped storage and others. Each of the known energy storage solutions suffer of drawbacks.

While battery storage systems are the prevalent technology in the field, batteries have limited life span, and are susceptible to environmental impacts. Furthermore, batteries storage systems require frequent monitoring and maintenance, thus incur high operation and maintenance costs. In some of the battery types the electrolyte comprises corrosive and hazardous materials, where the commonly used Lithium-Ion batteries are prone to thermal runaway if mistreated or abused. Therefore, such batteries storage systems also require contained and well monitored positioning. Pumped storage systems are adapted for storing high volume of energy, and have high efficiency in relation to other methods. However, these systems require special installation sites conditions, such as geographical height differences and water availability.

Some energy storage systems using pressurized gas and/or liquid are offered by the market. These systems convert electric power, consumed during low-demand term of the day, to a potential energy of pressurized gas. Unfortunately, these systems suffer from intrinsic low energy conversion efficiency, by employing a compressor for converting electrical energy to pressure-based stored energy. Such systems also require large-volume reservoirs for storing the gas at its unpressurized state.

Therefore it is an object of the present invention to provide a system for storing energy, not limited to special geographical locations for installation sites.

It is another object of the present invention to provide a system for storing energy, which employs non-hazardous materials.

It is yet another object of the present invention to provide system and method for storing energy, with improved energy conversion efficiency.

Other objects and advantages of the invention will become apparent as the description proceeds.

SUMMARY OF THE INVENTION

An energy storage system that uses liquid and gas as pistons, comprising:
  a) one or more electrically powered liquid pumps, for streaming liquid into liquid-gas tanks;
  b) one or more liquid-gas tanks, adapted to intake a portion of gas and to utilize liquid streamed by the one or more electrically powered liquid pumps, as a piston for compressing the received portion of gas, wherein the one or more liquid-gas tanks are further adapted to deliver the compressed gas to one or more compressed gas storage tanks, and to stream the liquid back to the one or more electrically powered liquid pumps;
  c) one or more compressed gas storage tanks adapted to store compressed gas received from the one or more liquid-gas tanks;
  d) pipping components, branches thereof, and controllable valves, for enabling controlled streaming of liquid and gas through the storage system;
  e) a plurality of sensors, adapted to provide information related to liquid and gas in the storage system, such as to enable corresponding control of the storage system by one or more controllers; and
  f) one or more controllers for managing the streaming of gas and liquid through the storage system.

In one aspect, the pipping branches which streams liquid into the one or more liquid-gas tanks enters the one or more liquid-gas tanks from their top end, and extends towards their bottom end.

The pipping branches which streams liquid into the one or more liquid-gas tanks may be adapted with a predetermined section area with respect to the section area of the one or more liquid-gas tanks, to determine the induced pressure of the liquid therein.

A power generation system that uses liquid and gas as pistons, comprising:
  a) one or more liquid-gas tanks, adapted to intake a portion of compressed gas and to utilize the portion of compressed gas as a piston, for forcing a streaming of liquid through one or more liquid turbines;
  b) one or more liquid turbines, adapted to receive liquid streamed from the one or more liquid-gas tanks, thereby to rotate an electric generator for producing electric power;
  c) pipping components, branches thereof, and controllable valves, for enabling controlled streaming of liquid and gas through the power generation system;
  d) a plurality of sensors, adapted to provide information related to liquid and gas in the storage system, such as to enable corresponding control of the power generation system by one or more controllers; and
  e) one or more controllers for managing the streaming of gas and liquid through the power generation system.

The power generation system may comprise two or more turbines, each of which being effective in a different liquid pressure range.

The one or more turbines may be selected from the group consisting of: a Pelton turbine, a Francis turbine, or any combination thereof.

The power generation system may be adapted to refill the one or more liquid-gas tanks with liquid returning from the liquid turbines against atmospheric pressure.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

A DETAILED DESCRIPTION OF EMBODIMENTS OF THE INVENTION

The present invention relates to a storage system that converts electrical energy to be stored in the form of pressurized gas, by utilizing streamed liquid as a piston that compresses the gas to be stored. The invention further relates to a power generation system which operates in an opposite manner, while utilizing pressurized gas as a piston for streaming liquid through a turbine that rotates an electric power generator, thereby converting energy stored in the form of pressurized gas to an electrical energy.

Since the energy stored by the proposed system is in the form of pressurized gas, which can be received from the atmospheric environment, it consumes relatively low space, thus enabling multiple applications adapted for limited space installations.

While a typical efficiency of a compressor may be in the range of 10%-20%, the efficiency of a respective liquid pump is known to be in the range of 70%-80% (e.g., a typical efficiency of centrifugal pumps that provide a dynamic pressure of 10 bar is 85%). Therefore, the proposed system utilizes a liquid pump for streaming liquid into liquid-gas vessels/tanks, in which the liquid is utilized as a piston that compresses a given volume of gas to be stored, instead of a compressor.

In the following detailed description, references are made to several embodiments of the present invention, examples of which are illustrated in the accompanying figures. The figures depict an embodiment of the present invention for purposes of illustration only. One skilled in the art will readily recognize from the following description that the described embodiments may be combined, alternative embodiments may be utilized, and other changes may be made without departing from the spirit or scope of the present invention described herein.

The terms, "for example", "for instance", "e.g.", "optionally", and the like, as used herein, are intended to be used to introduce non-limiting examples. While certain references are made to certain example system components or services, other components and services can be used and/or the example components can be combined into fewer components and/or divided into further components.

Furthermore, while the following description includes specific details related to significant components and operations of the invention, it may not include other well-known components and procedures for the sake of brevity and clarity of the present invention. For instance, various gas/liquid pressure and temperature sensors, controllers of controlled valves, and the like, which one skilled in the art will readily select such specific components for realizing specific embodiments of the present invention.

Figure 1A:
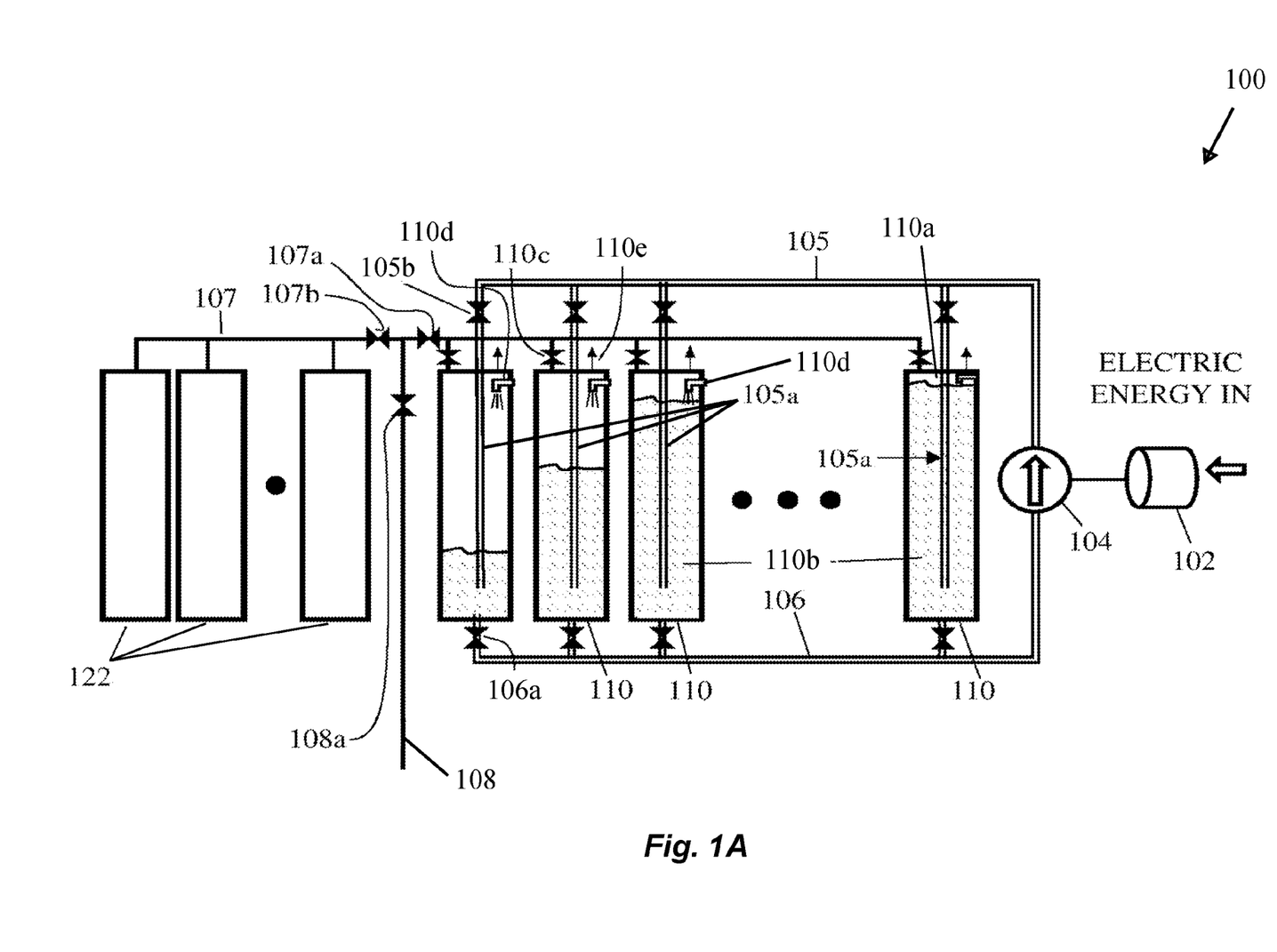
FIG. 1A schematically illustrates a system for storing energy, according to an embodiment of the present invention.

FIG. 1A schematically illustrates a system for storing energy by converting electrical energy to pressurized gas energy, according to an embodiment of the present invention. System 100 comprises an electrically powered liquid pump 104, such as a centrifugal pump, driven by an electrical motor 102, a plurality of liquid-gas tanks 110, each of which accommodates a gas portion 110a and a liquid portion 110b. System 100 further comprises a plurality of compressed gas storage tanks 122, utilized to store energy in the form of compressed gas.

While system 100 is illustrated herein as comprising a plurality of liquid-gas tanks 110 and a plurality of storage tanks 122, in some cases a single liquid-gas tank 110 and/or a single compressed gas storage tank 122 may suffice.

Pump 104 is in fluent communication with liquid-gas tanks 110 through a delivery pipe 105, branches 105a thereof, being controlled by corresponding controllable inlet valves 105b, and through a returning liquid pipe 106, being controlled by corresponding controllable outlet valves 106a.

Tanks 110 are also in fluent communication with storage tanks 122 through a pipe 107, being controlled by compressed gas supply valves 110c, and by controllable valves 107a and 107b. According to an embodiment of the present invention, each of storage tanks 122 is adapted with a dedicated controllable valve (not shown). Accordingly, each of tanks 110 may be in communication with one or more storage tanks 122 for delivering compressed gas to be stored therein.

Each of tanks 110 is adapted to receive liquid through a corresponding branch 105a of pipe 105 as controlled by a corresponding controllable inlet valve 105b. Pipe 105a enters tank 110 from its top end and extends towards the bottom of tank 110. This arrangement ensures that during the filling of liquid into any of tanks 110, the added liquid is added into liquid portion 110b.

The pressure at liquid portion 110b—"$P_T$"—is determined by the output pressure of pump 104—"$P_1$"—and the ratio between the cross sectional areas of tank 110—"S"—and the cross sectional area of branch 105a—"s", calculated by the following equation 1:

$$P_T = P_1 * \frac{S}{s} \qquad [1]$$

Therefore, the ratio between the cross sectional areas operates as a liquid-gas piston and the ratio S/s acts therefore as pressure amplifier with respect to the output pressure $P_1$ of pump 104. For instance, if the ratio S/s is selected to be 10, the pressure inside tank 110 may reach the magnitude of 10 times "$P_1$".

Figure 1B:
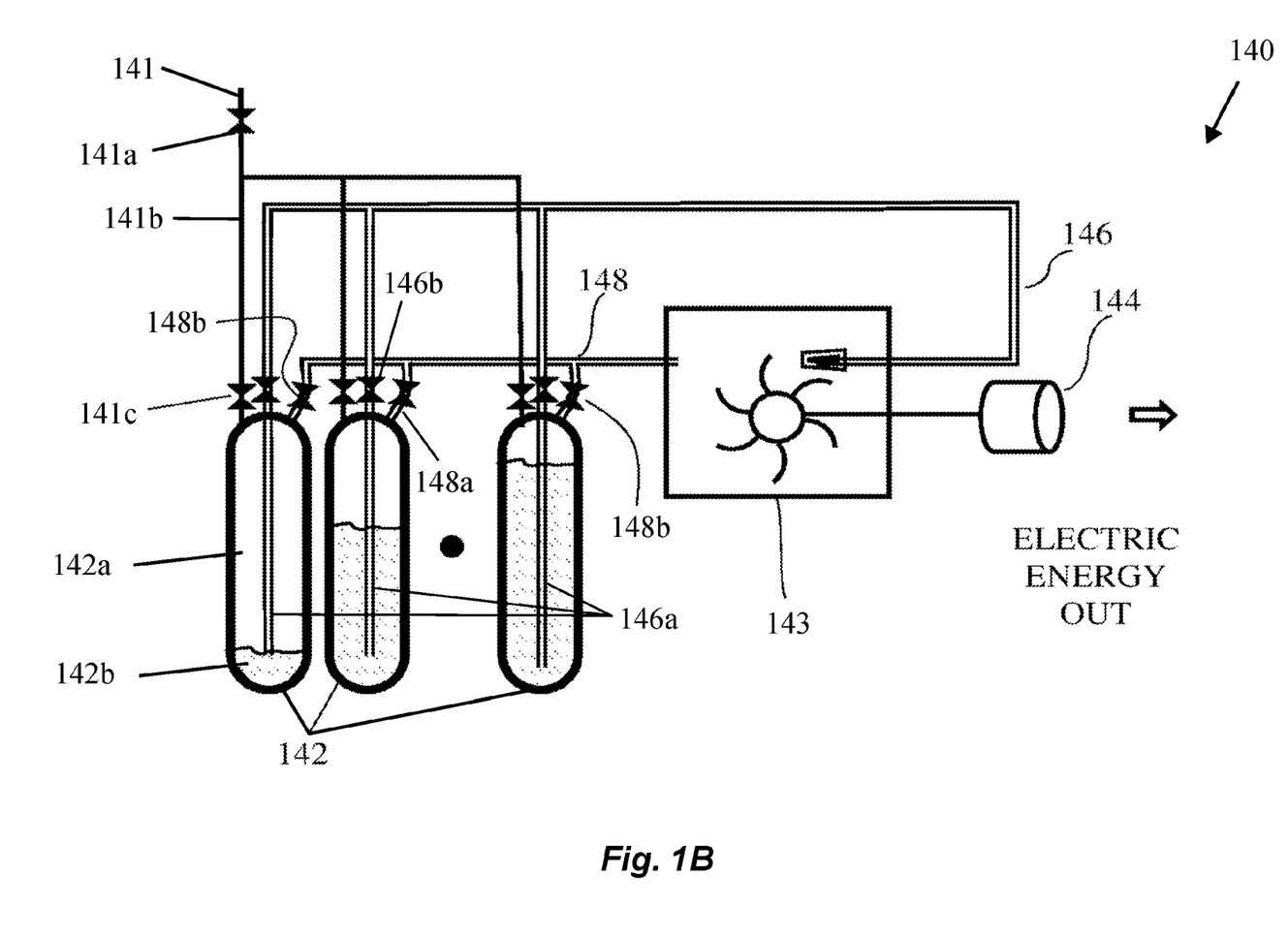
FIG. 1B schematically illustrates a power generating system for reconverting stored pressurized gas energy to electrical energy, according to an embodiment of the present invention.

System 100 further comprises a compressed gas supply pipe 108 adapted with a controllable valve 108a, through which storage tanks 122 can be in fluent communication with a power generation system (i.e., as controlled by valve 108a), which is adapted to reconvert the compressed gas energy into electrical energy, such as system 140 of FIG. 1B.

FIG. 1 further illustrates system 100 as operating with a closed liquid cycle, such as that no liquid-in or liquid-out streaming is required, and thus the total amount of liquid inside system 100 is substantially constant, except for compensation for lost liquid due to a leakage. Since the streamed liquid is at a lower temperature than the compressed gas portion 110a, it is utilized to moderate the temperature rise of gas portion 110a, thereby supporting an improved compression process thereof. Furthermore, according to an embodiment of the present invention, liquid may be sprayed by sprayers 110d into the compressed gas portion 110a in liquid-gas tanks 110, for controlling the heat level therein, whereas the gas is compressed to the desired high pressure. Sprayers 110d may be supplied by either pipe 105 or by an external power supply line (not shown for the sake of clarity of FIG. 1A).

The liquid of system 100 can be water, or any other liquid operative in the framework conditions (e.g., range of pressures and temperatures), as dictated by the requirements of various applications of system 100. Similarly, the gas of system 100 may be any gas operative in the expected operation conditions of the system, such as air. Air may also have a benefit of involving no production cost. Moreover, the gas cycle may be in an open cycle (i.e., to the atmosphere), according to embodiments of the invention, in which the use of air may be more advantageous.

During the energy storage operation of system 100, electrical energy is provided to electrical motor 102, which drives pump 104 to stream liquid through pipe 105 into one of tanks 110 which is connected to pipe 105 by the corresponding controllable inlet valve 105b, while the other tanks 110 are disconnected (i.e., by the other inlet valves 105b) from pipe 105. Simultaneously, liquid is supplied to pump 104 from other tanks 110 (i.e., which has finished a compression stroke) through pipe 106 as controlled by a corresponding controlled outlet valve 106a.

Compression Stroke

Tank 110 which is being filled performs a compression stroke, in which the gas portion 110a is being compressed by the liquid that is streamed in, namely, liquid portion 110b operates as a compression piston. Whereas the gas pressure in a currently filled tank 110 reached the target pressure, pump 104 may provide liquid to another tank 110.

According to an embodiment of the present invention, near the end of the compression stroke (i.e., whereas gas portion 110a is at its predetermined target pressure), the corresponding compressed gas supply valves 110c and outlet valves 106a are opened, in coordinated manner such as that valve 110c is initially closed, thus compressed gas portion 110a acts as a counter spring that forces the filled liquid portion 110b towards outlet valve 106a. After a predetermined short time compressed gas supply valve 110c, as well as valves 107a and 107b are being opened (i.e., while valve 108a is closed) and the compressed gas portion 110a is streamed towards one or more storage tanks 122.

Each time one of tanks 110 is filled by pump 104, another tank 110 which already finished its compression stroke and delivered compressed gas to tanks 122, provides liquid to pump 104 through, thereby enabling continuous liquid cycling and gas compression until tanks 122 reaches its full capacity at its target pressure.

Gas Intake Stroke

Whereas a tank 110 is being emptied from liquid which is streamed through pipe 106 towards pump 104 and the level of liquid in it decreases, a gas vent valve 110e may be opened such as to enable entry of additional gas to tank 110, for example, received from the ambient open air.

Furthermore, it can be noticed in FIG. 1A that tanks 110 are erected vertically, such as that during the intake stroke, only liquid is streamed out from tanks 110. Of course valves 106a are configured to shut off before tanks 110 are completely empty of liquid, such as to avoid mixing of gas and liquid within pipe 106.

System 100 commonly operates to store energy during low electricity demand periods, and supplies its stored energy during peak electricity demand periods. Nevertheless, alternative operational configurations of system 100 may allow a combined storage and supply mode of operation, for instance, alternately storage/supply of compressed gas in/from different tanks 122.

Power Generation Using Compressed Gas as a Piston

FIG. 1B schematically illustrates a power generating system 140 for reconverting stored pressurized gas energy to electrical energy, according to an embodiment of the present invention. System 140 comprises an inlet pipe 141, which is adapted to connect to a supply pipe of an energy storage system, such as pipe 108 of system 100 (of FIG. 1A), thereby system 140 is supplied with compressed gas.

System 140 further comprises a plurality of liquid-gas tanks 142 accommodating a gas portion 142a and a liquid portion 142b, a liquid turbine 143, an electric generator 144 (e.g., an electric stator-rotor arrangement known in the art), where tanks 142 are in fluent communication with turbine 143 through branches 146a of a delivery pipe 146 (i.e., controlled by controllable outlet valves 146b), and through branches 148a of a returning liquid pipe 148 (i.e., controlled by controllable valves 148b), for cycling liquid between liquid-gas tanks 142 and turbine 143.

Power Generation

Compressed gas received through inlet pipe 141 is streamed through a branch 141b (i.e., and through an open controllable valve 141c) into a tank 142 which is filled with liquid portion 142b. The received compressed gas portion 142a in tank 110 is utilized as a piston which forces liquid portion 142b out from tank 142 and through pipe 146 toward turbine 143. Accordingly, turbine 143 is caused to revolve and to rotate electric generator 144 which produces electricity.

Fluid at low pressure (i.e., at the outlet after turbine 143) is directed through pipe 148 and a corresponding branch 148a to another tank 142 and accumulate there. Directing of fluid back to a selected tank 142 is controlled by opening a respective controllable liquid return valve 148b.

According to an embodiment of the invention, each of tanks 142 comprises a controllable vent valve (not shown), thereby along the filling of returning liquid into a tank 142, the vent valve is opened to open air for enabling the returning fluid to accumulate in the tank 142 with negligible resistance of the air in the tank. When the fluid reaches a predetermined level in the tank, its filling may end another tank 142 may now be filled.

It should be understood that the use of system 140 in conjunction with system 100 is only optional, while one skilled in the art will readily recognize alternate power generation systems that may be employed in lieu or in parallel to system 140, for recovering the energy stored by system 100 in the form of compressed gas, for generating electric power. Furthermore, it should be understood that system 140 is adapted to receive compressed gas from alternate energy storage systems in lieu of in conjunction with system 100.

Figure 2:
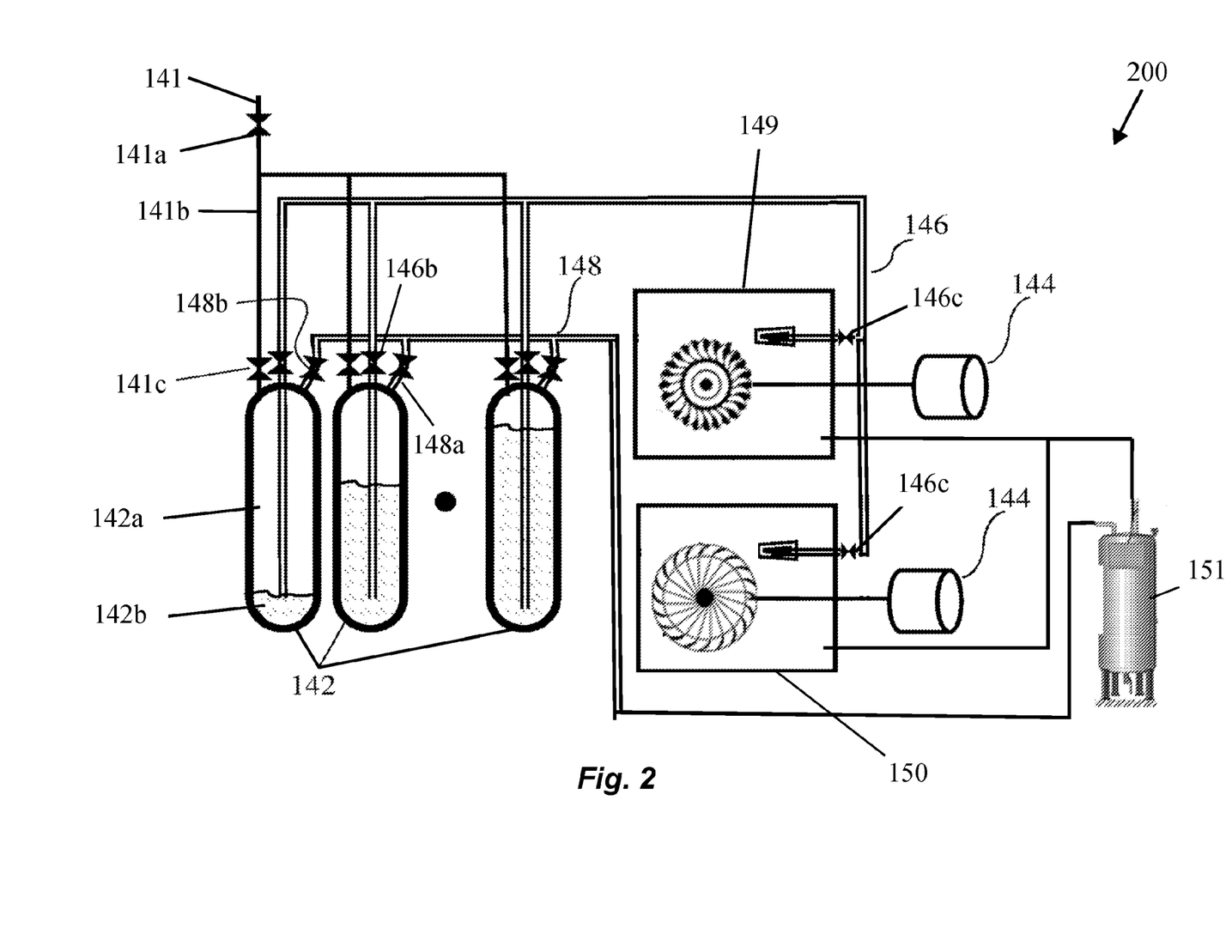
FIG. 2 schematically illustrates an alternative configuration of a power generating system, according to an embodiment of the present invention.

FIG. 2 schematically illustrates an alternative configuration of a power generating system 200, according to an embodiment of the present invention. System 200 utilizes two hydro generators, each of which is suitable for working in a different liquid pressure range. Turbines 149 and 150 are selectively supplied with cycled liquid through pipe 146, determined by corresponding controllable valves 146a, where turbine 149 is effective at high liquid pressures, while turbine 150 is effective at low liquid pressures.

System 200 differs from system 140 by that initially, liquid which is forced out from a tank 142 by compressed gas portion 142a is selectively streamed into turbine 149, and whereas the outlet liquid pressure in 142a is reduced to a predetermined level, valves 146c are controlled to direct the reduced pressure liquid to turbine 150.

According to an embodiment of the present invention, turbine 149 is a Pelton turbine that works efficiently at high pressures, and turbine 150 is a Francis turbine that works efficiently at low pressures.

Turbines 149 and 150 are connected to an atmospheric pressure liquid tank 151, into which liquid flows from the turbines outlets, without hydraulic resistance. The liquid than flows from tank 150 to fill a vented tank 142, which in turn supplied with compressed gas, thereby the liquid is cycled between tanks 142, turbines 149 and 150, and tank 151 against lowered resistance, thus providing higher cycle efficiency.

Figure 3:
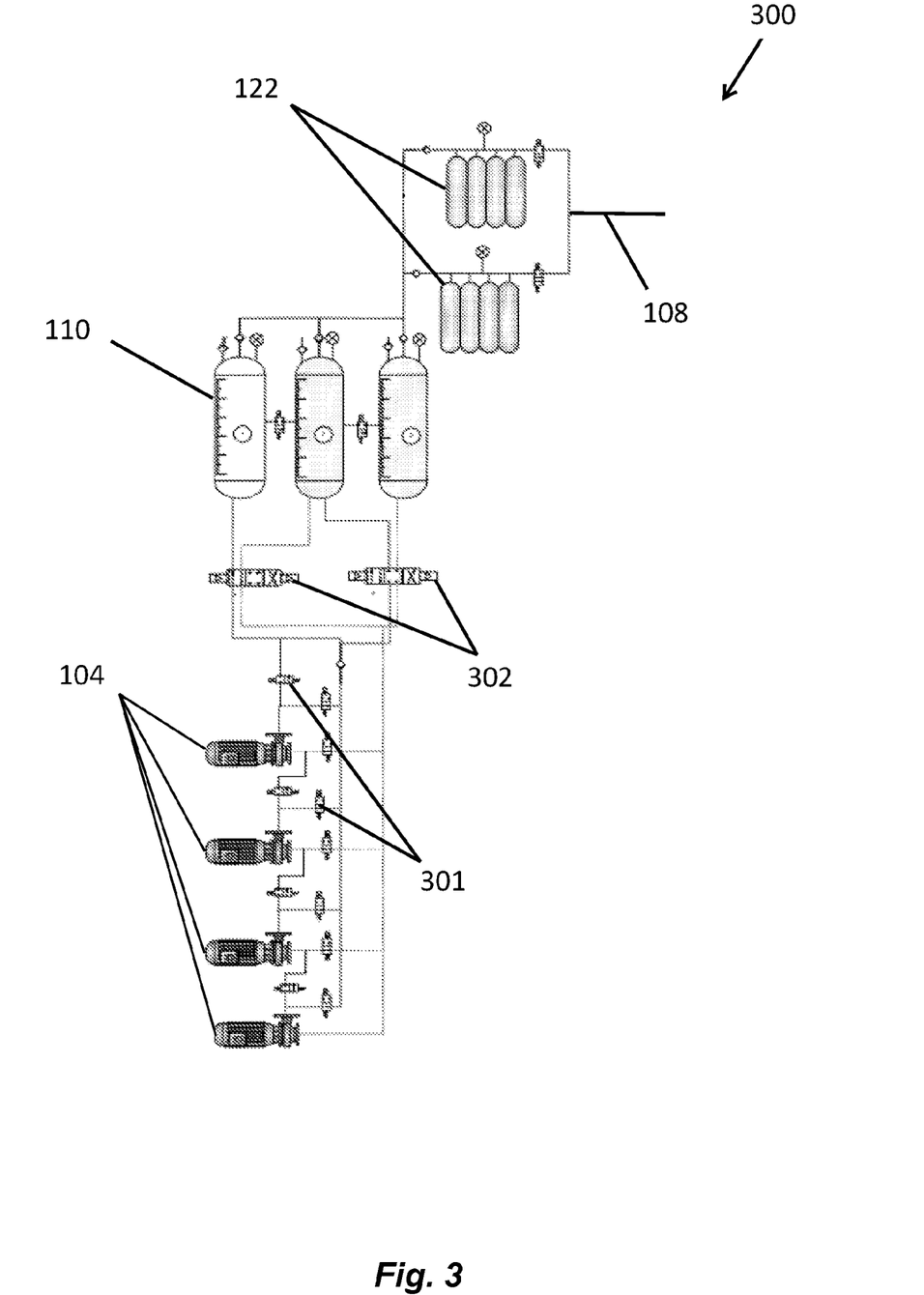
FIG. 3 schematically illustrates a system for storing energy, according to an embodiment of the present invention.

FIG. 3 schematically illustrates a system 300 for storing energy, according to an embodiment of the present invention. System 200 comprises an array of pumps 104 (i.e., while four pumps are shown in FIG. 3, further/fewer pumps 104 may be employed), for increasing the pressure inside storage tanks 110 to significantly higher pressures than the operational output pressure of a single pump 104.

Pumps 104 may either be connected in parallel for obtaining higher flow rates at moderate pressures, or serially for obtaining higher pressure at moderate flow rate. The connection mode is selected by controllable valves 301.

Further shown in FIG. 3 are switching valves 302, utilized for selecting a tank 110 to be filled with pumped liquid by pumps 104, as well as two groups of tanks 122, for enabling a selective delivery of a compressed gas from tanks 110 to fill individual tanks 122, to parallel fill tanks 110 within one of the groups, or to parallel fill all tanks 110 of system 300.

Although embodiments of the invention have been described by way of illustration, it will be understood that the invention may be carried out with many variations, modifications, and adaptations, without exceeding the scope of the claims.

The invention claimed is:

1. An energy storage system that uses liquid pistons and gas, comprising:
   a) one or more liquid-gas tanks, within each of which a portion of gas and a stream of liquid are receivable, the stream of liquid functioning as a piston for compressing the received portion of gas,
   b) one or more electrically powered liquid pumps, for delivering the stream of liquid into each of said liquid-gas tranks;
   c) one or more compressed gas storage tanks within each of which the compressed gas received from said one or more liquid-gas tanks is storable,
   d) piping components, branches thereof, and a plurality of control valves by which liquid and gas is controllably deliverable through said storage system; and
   e) one or more controller in data communication with said plurality of control valves, for managing flow of gas and liquid through said storage system,
   wherein the one or more controllers are operable to synchronize opening and closing of the plurality of control valves so the cyclical flow of liquid to and from said one or more liquid-gas tanks is always in a same direction and that the compressed gas is prevented from being mixed with the liquid during the cyclical flow,
   wherein the stored compressed gas is dischargeable externally to said storage system to release the stored energy.

2. The system according to claim 1, wherein each of the injection pipes penetrates the corresponding liquid-gas tanks from a top end, and extends towards thess a bottom end thereof.

3. The system according to claim 1, wherein each of the injection pipes is configured with a predetermined section area relative to the section area of said one or more liquid-gas tanks that defines induced pressure of the liquid therein.

4. The system according to claimed 1, further comprising a power generation system to which to stored compressed gas is dischargeable, said power generation system comprising:
   i. one or more additional liquid-gas tanks, adapted to intake a portion of compressed gas and to utilize said portion of compressed gas as a piston, for forcing a streaming of liquid through one or more liquid turbines;
   ii. the one or more liquid turbines, adapted to receive liquid streamd from said one or more additional liquid-gas tanks, thereby to rotate an electric generator for producing electric power; and
   iii. additional piping components, branches thereof, and a plurality of additional control valves, for enanbling controlled streaming of liquid and gas through said power generation system;
   wherein the one or more controllers are operable to synchronize opening and closing of the plurality of additional control valves to ensure sufficient flow of gas and liquid through said power generation system to produce electric power.

5. The system according to claim 4, comprising two or more turbines, each of which being effective in a different liquid pressure range.

6. The system according to claim 5, wherein the one or more turbines are selected from the group consisting of: a Pelton turbine, a Francis turbine, or any combination thereof.

7. The system according to claim 4, being adapt configured to refill said one or more additional liquid-gas tanks with liquid returning from the one or more liquid turbines against atmospheric pressure.

8. The system according to claim 4, further comprising a plurality of sensors in data communication with the one or more controllers, adapted to provide information related to liquid and gas in said power generation system.

9. The system according to claim 1, wherein a first of the piping components is a delivery pipe extending from a discharge of said one or more electrically powered liquid pumps, a second of the piping components is a return pipe extending to an inlet of each of said one or more electrically powered liquid pumps, a third of the piping components is a discharge pipe extending from an outlet of a corresponding liquid-gas tank to the return pipe and in communication therewith, and a fourth of the piping components is an injection pipe branching from the delivery pipe and extending within an interior of a corresponding liquid-gas tank, through which the stream of liquid is injected into the corresponding liquid-gas tank,
   wherein a fifth of the piping components is a transfer pipe in fluid communication with each of said liquid-gas tanks and compressed gas storage tanks, a sixth of the piping components is a branched pipe extending from a port of a corresponding liquid-gas tank or of a corresponding compressed gas storage tanks to the transfer pipe and in communication therewith, and a seventh of the piping components is a gas supply pipe in fluid communication with the transfer pipe, wherein a first of the control valves is operatively connected to each of the injection pipes, a second of the control valves is operatively connected to each of the discharge pipes, a third of the control valves is operatively connected to each of the branched pipes extending from a port of a corresponding liquid-gas tank, a fourth of the control valves is operatively connected to the gas supply pipe, a fifth of the control valves is operatively connected to the transfer pipe between the gas supply pipe and the one or more liquid-gas tanks, and a sixth of the control valves is operatively connected to the transfer pipe between the gas supply pipe and the one or more compressed gas storage tanks, wherein the one or more controllers are operable to synchronize opening and closing of the first, second and third control valves so that the flow of liquid through the delivery pipe, injection pipe, discharge pipe and return pipe is always in a same direction and that the compressed gas is prevented from being mixed with the liquid within the return pipe.

10. The system according to claim 1, further comprising a plurality of sensors in data communication with the one or more controllers, adapted to provide information related to liquid and gas in said storage system.

* * * * *

UNITED STATES PATENT AND TRADEMARK OFFICE
CERTIFICATE OF CORRECTION

| | | |
|---|---|---|
| PATENT NO. | : 12,322,966 B2 | Page 1 of 1 |
| APPLICATION NO. | : 18/275719 | |
| DATED | : June 3, 2025 | |
| INVENTOR(S) | : Shay Cohen | |

It is certified that error appears in the above-identified patent and that said Letters Patent is hereby corrected as shown below:

In the Claims

Claim 1, Column 7, Line 55, should read --c) one or more compressed gas storage tanks within each--

Claim 1, Column 7, Line 61, should read --e) one or more controllers in data communication with said--

Claim 2, Column 8, Line 7, should read --from a top end, and extends towards a bottom end--

Signed and Sealed this
Ninth Day of September, 2025

Coke Morgan Stewart
*Acting Director of the United States Patent and Trademark Office*